US012365296B2

(12) United States Patent
Shiraki

(10) Patent No.: US 12,365,296 B2
(45) Date of Patent: Jul. 22, 2025

(54) ELECTRICAL CONNECTION BOX BUSBAR CONNECTING TWO WIRES

(71) Applicant: SUMITOMO WIRING SYSTEMS, LTD., Mie (JP)

(72) Inventor: Takashi Shiraki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 334 days.

(21) Appl. No.: 18/010,386

(22) PCT Filed: Jun. 9, 2021

(86) PCT No.: PCT/JP2021/021827
§ 371 (c)(1),
(2) Date: Dec. 14, 2022

(87) PCT Pub. No.: WO2021/261244
PCT Pub. Date: Dec. 30, 2021

(65) Prior Publication Data
US 2023/0322171 A1    Oct. 12, 2023

(30) Foreign Application Priority Data

Jun. 26, 2020  (JP) ................................. 2020-110815

(51) Int. Cl.
*B60R 16/023* (2006.01)
*H01R 4/34* (2006.01)
*H02G 3/16* (2006.01)

(52) U.S. Cl.
CPC ........... *B60R 16/0239* (2013.01); *H01R 4/34* (2013.01); *H02G 3/16* (2013.01)

(58) Field of Classification Search
CPC ........ B60R 16/0238; H02G 3/08; H02G 3/18; H02G 5/00; H01R 4/34; H01R 11/01; H01R 11/287; H01R 9/226
See application file for complete search history.

(56) References Cited

U.S. PATENT DOCUMENTS 7,766,673 B1 *  8/2010  Dumont ............. H01R 13/5045
                                            439/907
8,382,525 B2 *  2/2013  Shiraki ................ H01R 11/287
                                            439/500

(Continued)

FOREIGN PATENT DOCUMENTS

JP   2006-004733 A   1/2006
JP   2014-087221 A   5/2014

OTHER PUBLICATIONS

International Search Report issued on Sep. 7, 2021 for WO 2021/261244 A1 (4 pages).

*Primary Examiner* — Vanessa Girardi
(74) *Attorney, Agent, or Firm* — Venjuris, P.C.

(57) ABSTRACT

A first electrical connection box includes a housing, a holder (50) that is provided inside the housing and holds an electrical component, and a terminal block (60) attached to the holder (50). The terminal block (60) includes a terminal support base (61) attached to the holder (50), and a busbar (62) supported on the terminal support base (61). The busbar (62) includes a planar first connection surface (84) to which a first wire (21) is to be electrically connected, and a planar second connection surface (86) to which a second wire (22) is to be electrically connected, the second wire (22) being different from the first wire (21). When a direction perpendicular to the first connection surface (84) is defined as a first direction (X11), the second connection surface (86) is perpendicular to a second direction (X12) that intersects with the first direction (X11).

10 Claims, 6 Drawing Sheets

(56) References Cited

U.S. PATENT DOCUMENTS

2009/0253294 A1  10/2009  Akahori et al.
2016/0141772 A1   5/2016  Yamauchi et al.
2017/0072802 A1   3/2017  Matsumura
2021/0218163 A1   7/2021  Shimizu et al.

* cited by examiner

ELECTRICAL CONNECTION BOX BUSBAR CONNECTING TWO WIRES

CROSS REFERENCE TO RELATED APPLICATIONS

This application is a national phase of PCT application No. PCT/JP2021/021827, filed on 9 Jun. 2021, which claims priority from Japanese patent application No. 2020-110815, filed on 26 Jun. 2020, all of which are incorporated herein by reference.

TECHNICAL FIELD

The present disclosure relates to an electrical connection box.

BACKGROUND

Conventionally, in vehicles such as automobiles, electrical apparatuses, electrical connection boxes, and the like that are disposed at positions apart from each other may be electrically connected to each other using electrical wires. In this case, if the electrical wires are long, there will be a risk that wiring of the electrical wires is difficult. Accordingly, in some cases, an electrical wire is divided into a plurality of wires in the longitudinal direction, and the divided wires are attached to a vehicle body. In this case, the divided wires are electrically connected to each other via a terminal block, which serves as a relay terminal for electrically connecting wires to each other.

As disclosed in Patent Document 1, the terminal block includes a conductive busbar, and an insulating resin component to which the busbar is assembled. By being electrically connected to the busbar of the terminal block assembled to the vehicle body, the wires for electrical connection are electrically connected to each other via the busbar.

PRIOR ART DOCUMENT

Patent Document

Patent Document 1: JP 2020-010514 A

SUMMARY OF THE INVENTION

Problems to be Solved

Meanwhile, in recent years, a large number of components are installed in a vehicle such as an automobile. Therefore, there may be cases where no space for arranging a terminal block is ensured in the vehicle. In this case, it is conceivable that a terminal block is formed as one piece with an electrical connection box that is disposed near a position at which the terminal block is desired to be provided. However, if a terminal block is simply formed as one piece with an electrical connection box, the electrical connection box will increase in size.

It is an object of the present disclosure to provide an electrical connection box that includes a terminal block for electrically connecting wires to each other, and is suppressed from increasing in size.

Means to Solve the Problem

According to the present disclosure, an electrical connection box includes: a housing; a holder that is provided inside the housing, and holds an electrical component; and a terminal block attached to the holder, wherein the terminal block includes a terminal support base attached to the holder, and a busbar supported on the terminal support base, the busbar includes a planar first connection surface to which a first wire is to be electrically connected, and a planar second connection surface to which a second wire is to be electrically connected, the second wire being different from the first wire, and when a direction perpendicular to the first connection surface is defined as a first direction, the second connection surface is perpendicular to a second direction that intersects with the first direction.

Effect of the Invention

The electrical connection box according to the present disclosure includes a terminal block for electrically connecting wires to each other, and can be suppressed from increasing in size.

DETAILED DESCRIPTION TO EXECUTE THE INVENTION

Description of Embodiments of Present Disclosure

Figure 1:
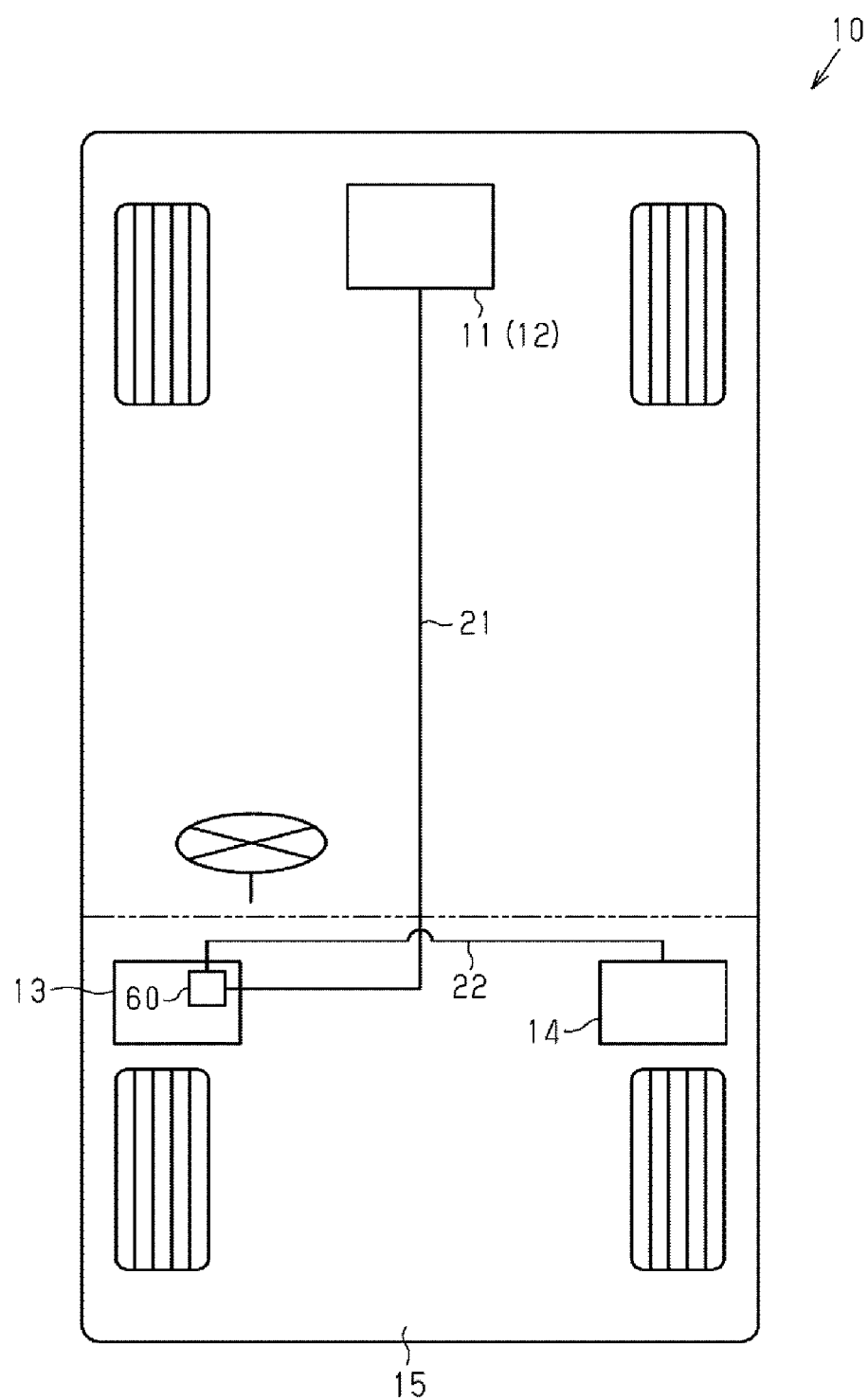
FIG. 1 is a schematic diagram illustrating a vehicle in which an electrical connection box according to an embodiment is installed.

First, embodiments of the present disclosure will be listed and described.

[1] An electrical connection box according to the present disclosure includes a housing; a holder that is provided inside the housing, and holds an electrical component; and a terminal block attached to the holder, wherein the terminal block includes a terminal support base attached to the holder, and a busbar supported on the terminal support base, the busbar includes a planar first connection surface to which a first wire is to be electrically connected, and a planar second connection surface to which a second wire is to be electrically connected, the second wire being different from the first wire, and when a direction perpendicular to the first connection surface is defined as a first direction, the second connection surface is perpendicular to a second direction that intersects with the first direction.

According to this configuration, by electrically connecting the first wire to the first connection surface and electrically connecting the second wire to the second connection surface, it is possible to electrically connect the first wire and the second wire via the busbar. Also, the second connection surface is perpendicular to the second direction that intersects with the first direction perpendicular to the first connection surface. Accordingly, the busbar can be downsized in a direction parallel to the first connection surface, that is, a direction perpendicular to the first direction, compared to a case where the first connection surface and the second connection surface are provided in the same plane. Also, the busbar can be downsized in a direction perpendicular to the first direction, compared to a case where the first connection surface and the second connection surface are parallel to each other and are lined up without overlapping each other when viewed in the first direction. Accordingly, it is possible to reduce the area of an installation space for the busbar when viewed in the first direction. As a result, the terminal block can be downsized in a direction perpendicular to the first direction, thus making it possible to suppress an increase in the size of the electrical connection box including the terminal block. That is to say, it is possible to install, in the electrical connection box, the terminal block for electrically connecting the first wire and the second wire, while suppressing an increase in the size of the electrical connection box.

[2] Preferably, the second direction intersects perpendicularly with the first direction.

With this configuration, the second connection surface is provided so as to be perpendicular to the first connection surface. Accordingly, it is possible to suppress a space for the second connection surface to the minimum when the busbar is viewed in the first direction. As a result, the busbar can further be downsized in a direction parallel to the first connection surface, that is, a direction perpendicular to the first direction. Accordingly, it is possible to further reduce the area of an installation space for the busbar when viewed in the first direction, making it possible to further downsize the terminal block in the direction perpendicular to the first direction. As a result, it is possible to further suppress an increase in the size of the electrical connection box including the terminal block. That is to say, it is possible to install, in the electrical connection box, the terminal block for electrically connecting the first wire and the second wire, while suppressing an increase in the size of the electrical connection box.

[3] Preferably, the terminal block includes a first bolt that penetrates the first connection surface.

With this configuration, by using a nut that is screwed to the first bolt, it is possible to easily electrically connect the first wire to the first connection surface.

[4] Preferably, the terminal block includes a second bolt that penetrates the second connection surface.

With this configuration, by using a nut that is screwed to the second bolt, it is possible to easily electrically connect the second wire to the second connection surface.

Detail of Embodiments of Present Disclosure

The following will describe specific examples of the electrical connection box of the present disclosure with reference to the drawings. Note that the present invention is not limited to these examples but is defined by the claims, and all modifications within the meaning and scope equivalent to the claims are intended to be included.

The following will describe an embodiment of the electrical connection box. FIG. 1 is a schematic diagram illustrating a vehicle 10 in which an electrical connection box 13 according to the present embodiment is installed, when viewed from above. A downward direction in FIG. 1 corresponds to the forward of the vehicle 10. A plurality of electrical apparatuses are installed in the vehicle 10. FIG. 1 shows only one electrical apparatus 11, among the plurality of electrical apparatuses installed in the vehicle 10. In the present embodiment, the electrical apparatus 11 is a battery 12 that can supply a voltage of about a hundred and several tens of volts to several hundred of volts, for example. Incidentally, the battery 12 is electrically connected to a wheel driving motor, which serves as a power source for travel of the vehicle. The battery 12 is arranged in a rear portion of the vehicle 10.

The vehicle 10 includes a first electrical connection box 13 and a second electrical connection box 14. Note that electrical connection boxes may be referred to also as junction boxes, fuse boxes, relay boxes, and the like, but in the present specification, these are collectively referred to as electrical connection boxes. The first electrical connection box 13 includes a terminal block 60, which serves as a relay terminal for electrically connecting wires to each other. In the present embodiment, the second electrical connection box 14 does not include such a terminal block.

The first electrical connection box 13 and the second electrical connection box 14 are arranged forward of the battery 12 in the vehicle 10. In the present embodiment, the first electrical connection box 13 and the second electrical connection box 14 are arranged in an engine room 15 provided in a front portion of the vehicle 10. The first electrical connection box 13 is arranged in a left-side portion of the engine room 15. The second electrical connection box 14 is arranged at a position apart from the first electrical connection box 13. In the present embodiment, the second electrical connection box 14 is arranged to the right of the first electrical connection box 13 in the engine room 15.

The battery 12 is electrically connected to the second electrical connection box 14 via a first wire 21, the terminal block 60 provided in the first electrical connection box 13, and a second wire 22. That is, the terminal block 60 electrically connects the first wire 21 and the second wire 22.

First Electrical Connection Box 13

Figure 2:
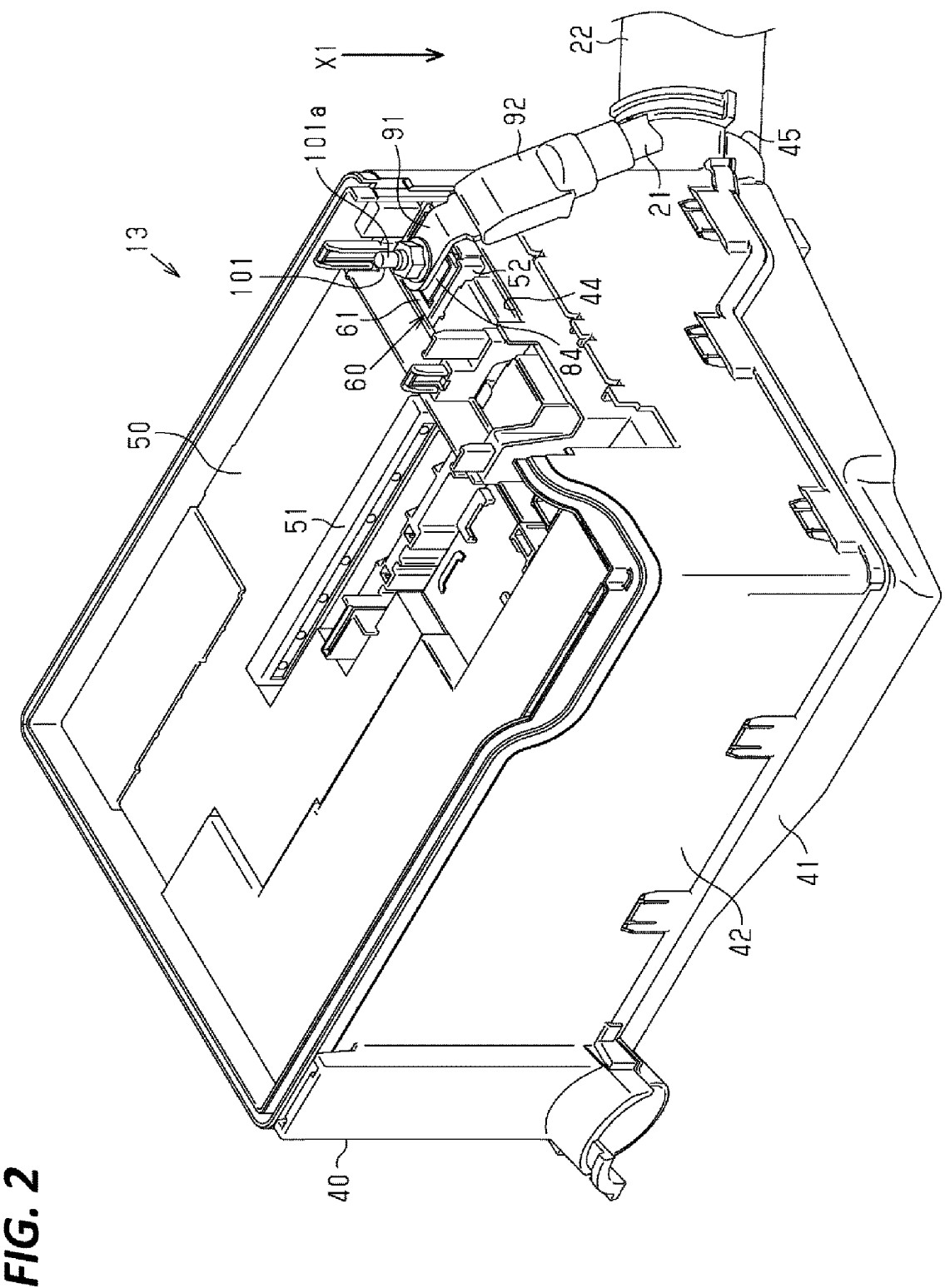
FIG. 2 is a perspective view illustrating the electrical connection box according to the embodiment.

As shown in FIG. 2, the first electrical connection box 13 includes a housing 40, a holder 50 provided inside the housing 40, and the terminal block 60 attached to the holder 50.

The housing 40 is cuboid. The housing 40 is made of an insulating synthetic resin material. The housing 40 includes a dish-shaped case 41, and a cover 42 that covers an opening of the case 41. The holder 50 is arranged in a housing space formed by the case 41 and the cover 42.

The holder 50 is made of an insulating synthetic resin material. The holder 50 holds at least one electrical component 51. Examples of the electrical component 51 include a fuse and a relay. In the present embodiment, the electrical component 51 includes a fusible link.

Figure 3:
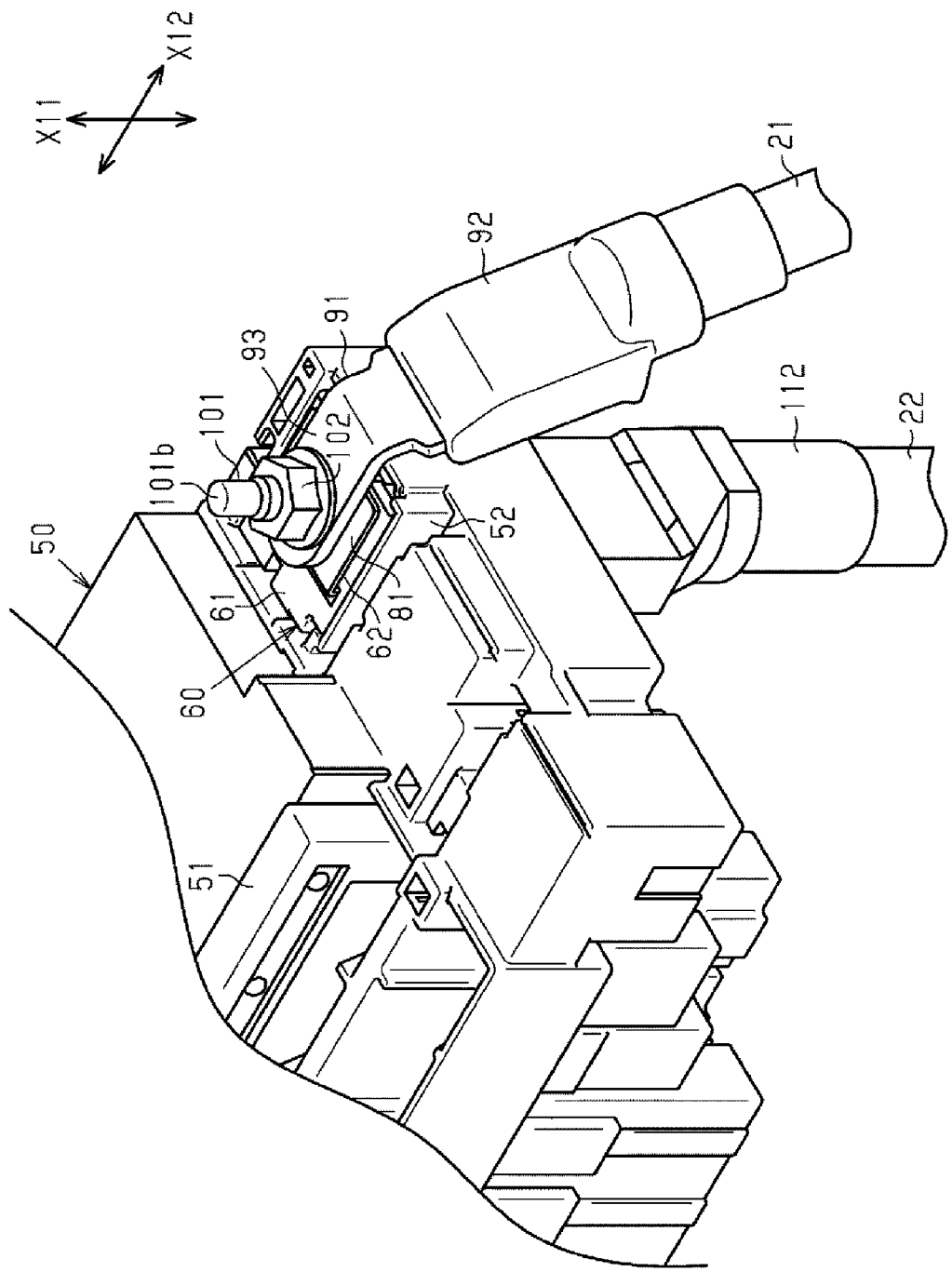
FIG. 3 is a perspective view illustrating a holder to which a terminal block according to the embodiment is attached.

As shown in FIGS. 2 and 3, the holder 50 includes an attaching portion 52 to which the terminal block 60 is attached. The attaching portion 52 is formed as one piece with the portion of the holder 50 other than the attaching portion 52. Here, a direction in which the cover 42 is fitted to the case 41 is defined as a fitting direction X1. The attaching portion 52 of the present embodiment is tubular extending in the fitting direction X1. The attaching portion 52 is square tubular such that the shape of the attaching portion 52 when viewed in the fitting direction X1 is square.

As shown in FIG. 2, the cover 42 has an exposure opening 44 that exposes the attaching portion 52 to the outside of the housing 40. The exposure opening 44 is provided in a portion of the cover 42 that is overlapped with the attaching portion 52 in the fitting direction X1. Also, the housing 40 has a wire draw-out opening 45 near the exposure opening 44. The wire draw-out opening 45 is in communication with the inside and outside of the housing 40.

Terminal Block 60

Figure 4:
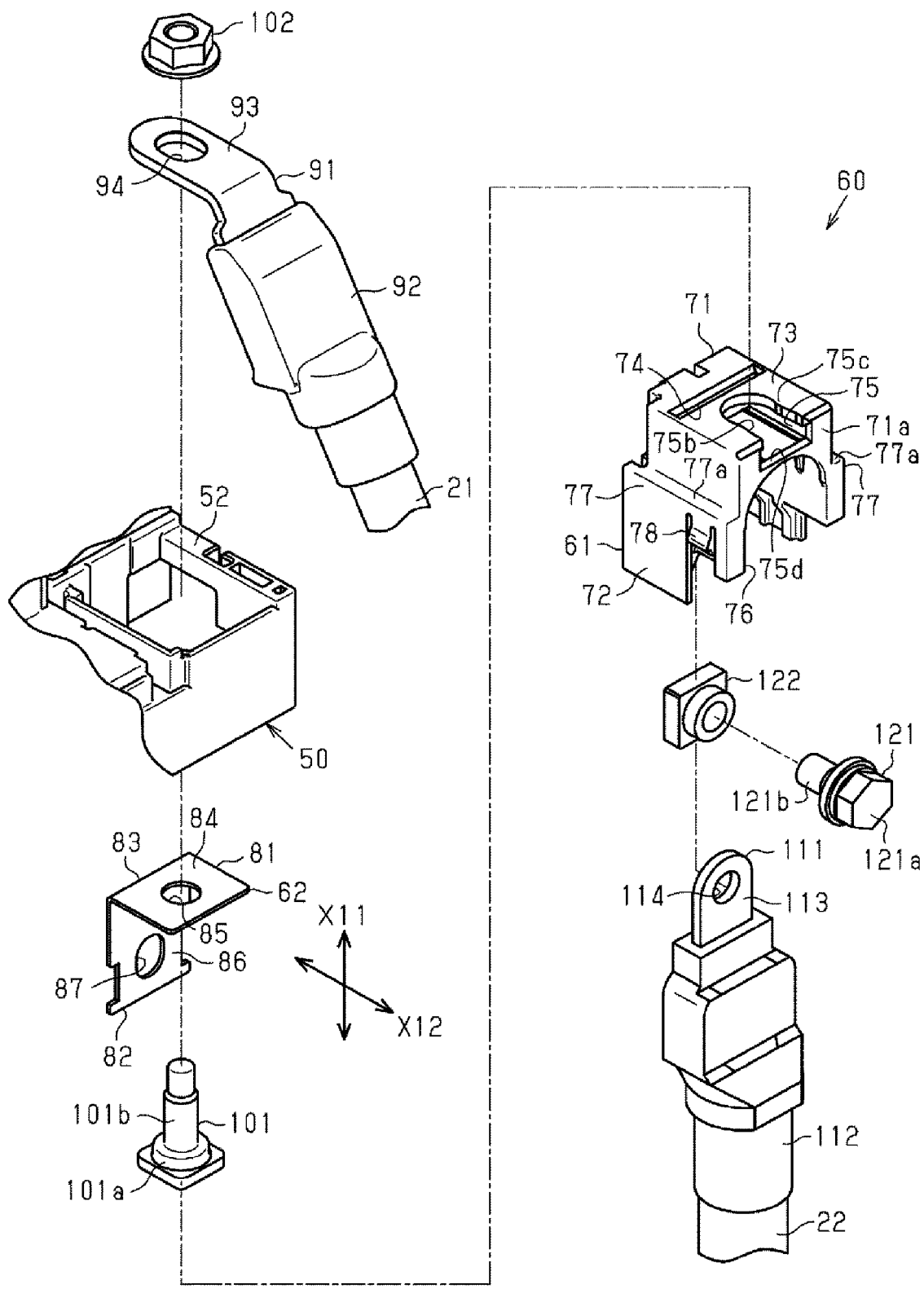
FIG. 4 is an exploded perspective view illustrating the terminal block provided in the electrical connection box according to the embodiment.

As shown in FIGS. 3 and 4, the terminal block 60 includes a terminal support base 61 attached to the holder 50, and a busbar 62 supported on the terminal support base 61.

Terminal Support Base 61

The terminal support base 61 is made of an insulating synthetic resin material. The terminal support base 61 includes a plate-shaped support portion 71, and a fitting portion 72 extending from the outer peripheral edge of the support portion 71. The support portion 71 and the fitting portion 72 are formed as one piece. The terminal support base 61 has the shape of a closed tube whose bottom is configured by the support portion 71.

The support portion 71 has a square shape corresponding to the inner peripheral surface of the attaching portion 52, when viewed in the thickness direction of the support portion 71. The support portion 71 has, on a surface of the support portion 71, a planar support surface 73. In the present embodiment, the support surface 73 is a side surface of the support portion 71 on one side in the thickness direction of this support portion 71, and constitutes a part of the outer surface of the terminal support base 61.

The support portion 71 has an insertion hole 74. The insertion hole 74 penetrates the support portion 71 in the thickness direction of this support portion 71. The insertion hole 74 is slit-shaped extending linearly when viewed in a direction perpendicular to the support surface 73. In the present embodiment, the insertion hole 74 extends parallel to one side surface 71a, among four side surfaces constituting the outer peripheral surface of the support portion 71, when viewed in the direction perpendicular to the support surface 73.

Also, the support portion 71 includes an insertion recess 75. In the support portion 71, the insertion recess 75 is formed between the insertion hole 74 and the side surface 71a. The insertion recess 75 is recessed from the support surface 73 in the thickness direction of the support portion 71. The bottom of the insertion recess 75 is parallel to the support surface 73. In an opening 75b of the insertion recess 75 that is formed in the support surface 73, a retaining portion 75c is provided that extends, like eaves, in directions parallel to the support surface 73 so as to reduce the dimension of the opening 75b. Also, the support portion 71 includes, in addition to the opening 75b of the insertion recess 75, an insertion opening 75d that is in communication with the inside of the insertion recess 75 and the outside of the terminal support base 61. The insertion opening 75d is formed in the side surface 71a. Also, the insertion opening 75d is continuous with the opening 75b. The insertion opening 75d is open in a direction perpendicular to the direction in which the insertion hole 74 extends, when viewed in the direction perpendicular to the support surface 73.

The fitting portion 72 is square tubular. The fitting portion 72 includes a cutout 76 that is in communication with the inside and outside of the fitting portion 72. The cutout 76 is provided at a position of the fitting portion 72 that is lined up with the insertion opening 75d in the direction perpendicular to the support surface 73. Also, when viewed in the direction perpendicular to the support surface 73, the insertion hole 74 and the cutout 76 are lined up in the direction perpendicular to the direction in which the insertion hole 74 extends. The cutout 76 penetrates the fitting portion 72 in the direction perpendicular to the direction in which the insertion hole 74 extends, when viewed in the direction perpendicular to the support surface 73, and is open in the opposite direction to the support portion 71.

The fitting portion 72 includes first locked portions 77 and second locked portions 78 that are used to fix the terminal support base 61 to the attaching portion 52. The first locked portions 77 are provided at both end portions of the fitting portion 72 in the direction in which the insertion hole 74 extends, when viewed in the direction perpendicular to the support surface 73. The first locked portions 77 are step-shaped while protruding to outer peripheral sides of the fitting portion 72. The first locked portions 77 each have a first locked surface 77a that is directed to the same direction as the support surface 73, and is parallel to the support surface 73.

The second locked portions 78 are provided at both end portions of the fitting portion 72 in the direction in which the insertion hole 74 extends, when viewed in the direction perpendicular to the support surface 73. At both end portions of the fitting portion 72 in the direction in which the insertion hole 74 extends, the second locked portions 78 are respectively provided at positions further away from the support surface 73 in the direction perpendicular to the support surface 73 than the first locked surfaces 77a. The second locked portions 78 each have a not-shown second locked surface that faces away from the support surface 73.

As shown in FIGS. 2 to 4, the terminal support base 61 is attached to the attaching portion 52 by being inserted into this attaching portion 52. The terminal support base 61 is inserted into the attaching portion 52 so that the support portion 71 is located on the cover 42 side, and the fitting portion 72 is located on the case 41 side. Note that the attaching portion 52 includes not-shown first locking portions to which the first locked portions 77 are locked in the insertion direction of the fitting portion 72 into the attaching portion 52. The attaching portion 52 further includes not-shown second locking portions to which the second locked portions 78 are locked in the opposite direction to the insertion direction of the fitting portion 72 into the attaching portion 52. As a result of the first locked surfaces 77a of the first locked portions 77 abutting against the first locking portions, the terminal support base 61 is prevented from being removed from the attaching portion 52 in the insertion direction of the terminal support base 61 into the attaching portion 52. Also, as a result of the second locked surfaces of the second locked portions 78 abutting against the second locking portions, the terminal support base 61 is prevented from being removed from the attaching portion 52 in the opposite direction to the insertion direction of the terminal support base 61 into the attaching portion 52.

Busbar 62

Figure 5:
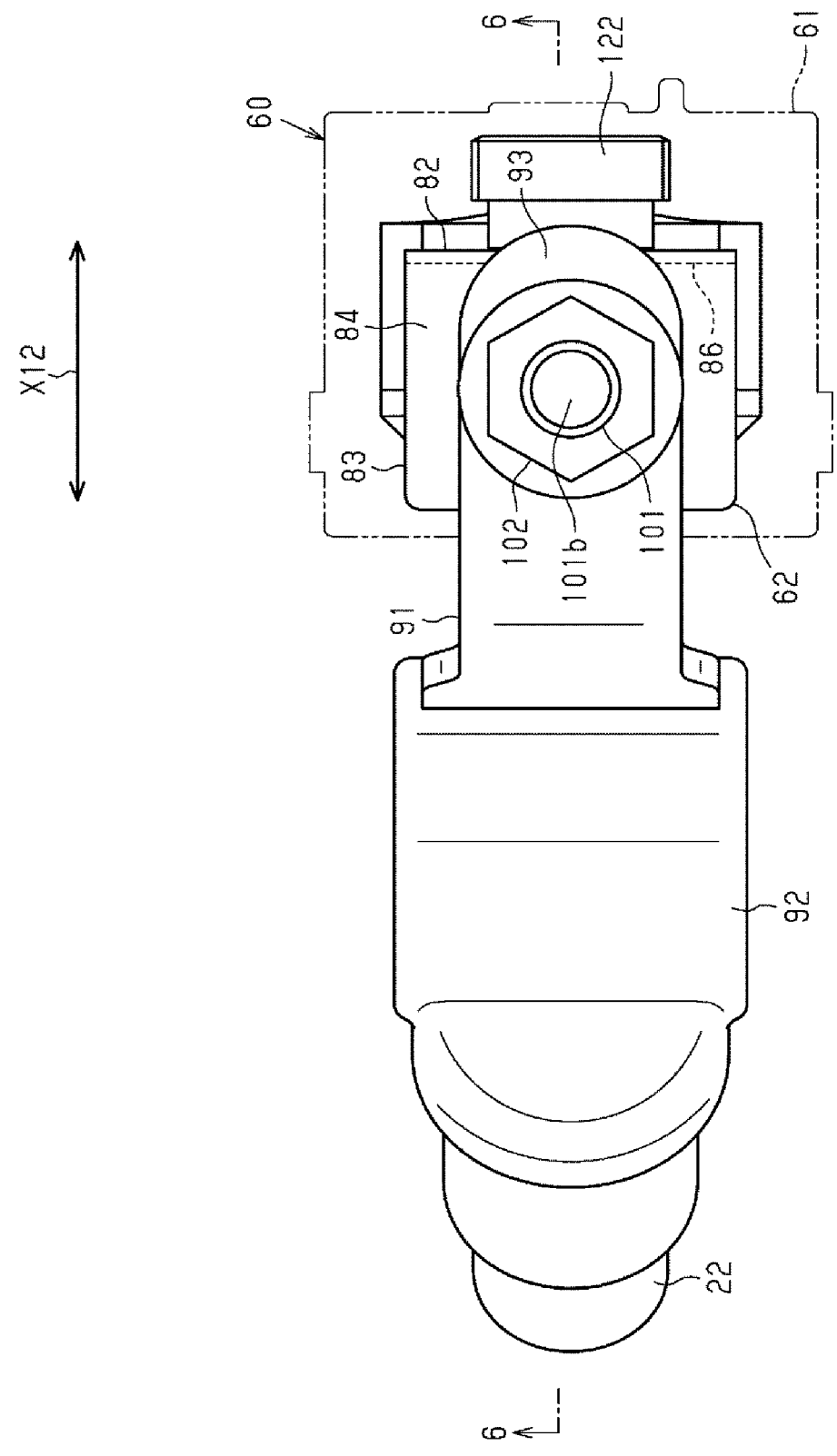
FIG. 5 is a plane view illustrating the terminal block provided in the electrical connection box according to the embodiment.
Figure 6:
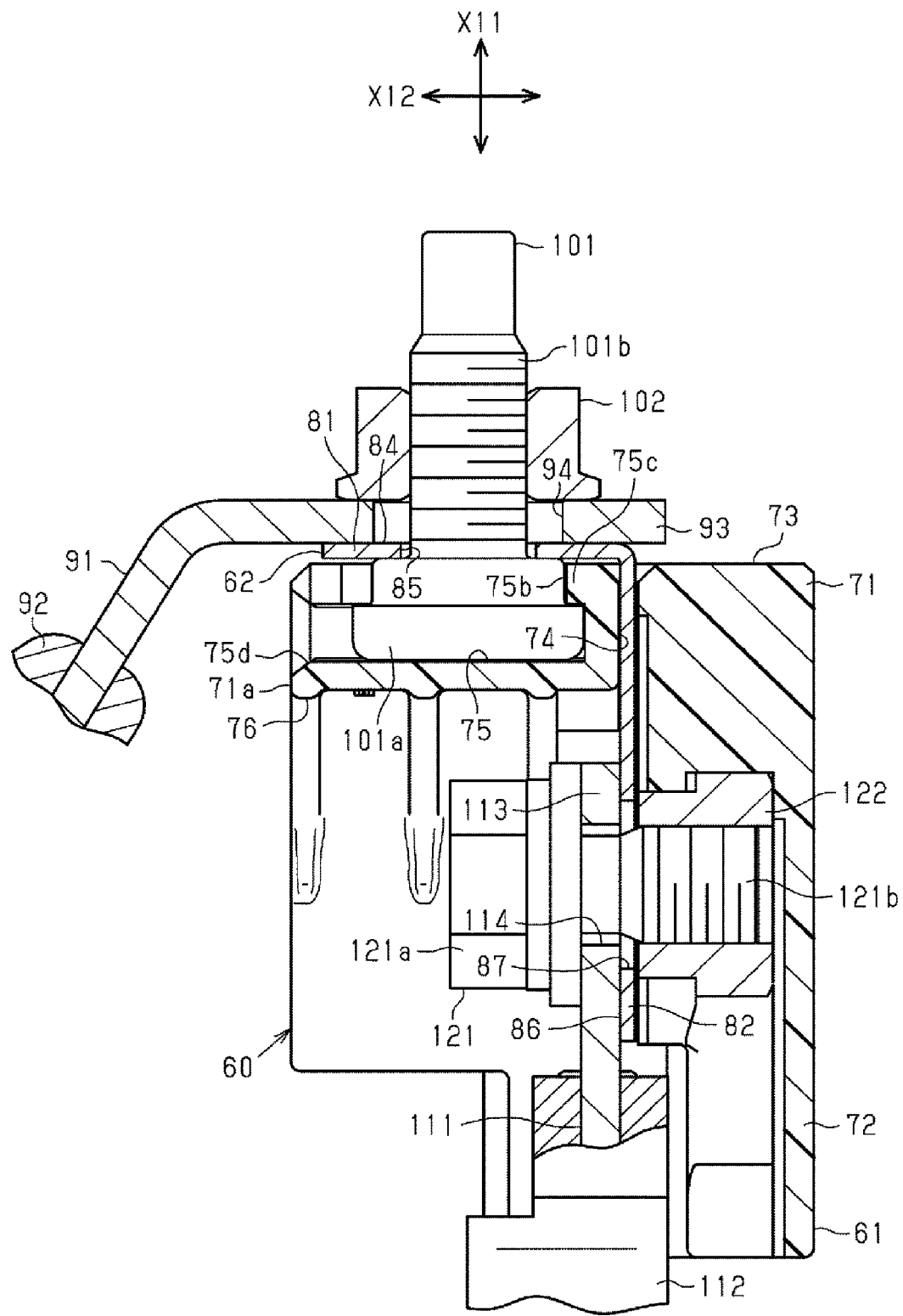
FIG. 6 is a cross-sectional view illustrating the electrical connection box according to the embodiment.

As shown in FIGS. 4 to 6, the busbar 62 includes a first connection 81 to which the first wire 21 is electrically connected, and a second connection 82 to which the second wire 22 is electrically connected. Note that FIG. 5 only shows the outer shape of the terminal support base 61 with a dashed-two dotted line. Also, FIG. 6 is a cross-sectional view taken along a line 6-6 in FIG. 5. The busbar 62 is made of a metal material. Examples of the material of the busbar 62 include a metal material having excellent conductive properties, such as copper, a copper alloy, aluminum, and an aluminum alloy, but the present invention is not limited to this and any material may be used as long as it is a metal material.

The busbar 62 of the present embodiment is band-shaped. The first connection 81 is provided at one end portion of the busbar 62 in the longitudinal direction, and the second connection 82 is provided at the other end portion of the busbar 62 in the longitudinal direction. The busbar 62 has a bent portion 83 between the first connection 81 and the second connection 82. The bent portion 83 is a portion of the busbar 62 that is formed by bending a metal plate material making up the busbar 62. Of the busbar 62 of the present embodiment, a portion from the bent portion 83 to one end of the busbar 62 in the longitudinal direction serves as the first connection 81, and a portion from the bent portion 83 to the other end of the busbar 62 in the longitudinal direction serves as the second connection 82. Accordingly, the busbar 62 of the present embodiment is L-shaped when viewed in a direction parallel to the first connection 81 and in a direction parallel to the second connection 82.

The first connection 81 has the shape of a square flat plate. A side surface of the first connection 81 on one side in the thickness direction is a first connection surface 84 to which the first wire 21 is to be electrically connected. In FIGS. 4 and 6, of two side surfaces of the first connection 81 in the thickness direction, the upper side surface corresponds to the first connection surface 84. Here, the direction perpendicular to the first connection surface 84 is defined as a first direction X11.

The first connection 81 has a first through hole 85 that penetrates the first connection 81 in the thickness direction thereof. The first through hole 85 penetrates the first connection 81 in the first direction X11. An opening of the first through hole 85 at an end in the penetrating direction is formed in the first connection surface 84.

The second connection 82 has the shape of a square flat plate. A side surface of the second connection 82 on one side in the thickness direction is a second connection surface 86 to which the second wire 22, which is different from the first wire 21, is to be electrically connected. In FIG. 4, of two side surfaces of the second connection 82 in the thickness direction, a side surface directed to the right corresponds to the second connection surface 86. Also, in FIG. 6, of two side surfaces of the second connection 82 in the thickness direction, a side surface on the left side corresponds to the second connection surface 86. The second connection surface 86 has the shape of a flat plate perpendicular to a second direction X12, which intersects with the first direction X11. In the present embodiment, the second direction X12 is a direction that intersects perpendicularly with the first direction X11. Accordingly, the second connection surface 86 is provided so as to be perpendicular to the first connection surface 84.

The second connection 82 has a second through hole 87 that penetrates the second connection 82 in the thickness direction thereof. The second through hole 87 penetrates the second connection 82 in the second direction X12. An opening of the second through hole 87 at an end in the penetrating direction is formed in the second connection surface 86.

The busbar 62 is supported on the terminal support base 61 with the second connection 82 inserted into the insertion hole 74 from the support surface 73 side. In the state in which the busbar 62 is supported on the terminal support base 61, the second connection 82 protrudes to the inside of the fitting portion 72 from the insertion hole 74, and the second through hole 87 is located on the inner side of the fitting portion 72. Furthermore, the second through hole 87 is overlapped with the cutout 76 in the second direction X12. Also, in the same state, the first connection 81 is arranged on the support surface 73 with the first connection surface 84 facing away from the support surface 73. Also, the first connection surface 84 is parallel to the support surface 73. That is to say, the first direction X11 is perpendicular to the support surface 73. Also, the first through hole 85 is overlapped with the opening 75b of the insertion recess 75 in the first direction X11.

First Wire 21

The first wire 21 is, for example, a coated wire that includes a core wire made of an electrical conductor, and an insulating coating that coats the outer circumference of the core wire. One end portion of the first wire 21 is electrically connected to the battery 12 shown in FIG. 1. A first terminal 91 for electrically connecting the first wire 21 to the busbar 62 is connected to the other end portion of the first wire 21. For example, when the not-shown core wire of the first wire 21 at the other end portion of the first wire 21 is electrically connected to one end portion of the first terminal 91 by welding, pressure bonding or the like, the first wire 21 and the first terminal 91 are electrically connected to each other. The electrical connection portion between the core wire of the first wire 21 and the first terminal 91 is coated by an insulating member 92 that has insulating properties. For example, a heat shrinkable tube can be used as the insulating member 92.

The first terminal 91 includes, at an end portion of the first terminal 91 located opposite to its end to which the first wire 21 is connected, a first wire-side connection 93 in a flat-plate shape. The first wire-side connection 93 has a first connection hole 94 that penetrates the first wire-side connection 93 in the thickness direction.

The terminal block 60 includes a first bolt 101 for electrically connecting the first wire 21 to the busbar 62. The first bolt 101 includes a head 101a and a shaft 101b that protrudes from the head 101a. A spiral thread groove is formed in the outer circumferential surface of the shaft 101b. The first bolt 101 is assembled to the terminal support base 61 before the busbar 62 is assembled to the terminal support base 61. Specifically, by inserting the head 101a of the first bolt 101 into the insertion recess 75 from the insertion opening 75d with the leading end of the shaft 101b facing away from the fitting portion 72, the first bolt 101 is assembled to the support portion 71. The shaft 101b protrudes from the opening 75b of the insertion recess 75 to the outside of the terminal support base 61. Note that the head 101a is prevented from being removed from the opening 75b to the outside of the insertion recess 75 by the retaining portion 75c. In a state in which the first bolt 101 is assembled to the terminal support base 61, the central axis of the shaft 101b is perpendicular to the support surface 73.

The first connection 81 of the busbar 62 is disposed on the support surface 73 with the shaft 101b of the first bolt 101 inserted into the first through hole 85. Accordingly, the shaft 101b is in a state of penetrating the first connection surface 84. The central axis line of the shaft 101b is perpendicular to the first connection surface 84, that is, parallel to the first direction X11. Also, the first wire-side connection 93 of the first terminal 91 is overlapped with the first connection 81 with the shaft 101b inserted into the first connection hole 94. The first wire-side connection 93 abuts against the first connection surface 84. Furthermore, as a result of a first nut 102 being fastened to the shaft 101b from the leading end side of the shaft 101b, the first connection 81 and the first wire-side connection 93 are interposed between the first nut 102 and the support portion 71. That is to say, the first wire-side connection 93 is electrically connected to the first connection 81. In this way, the first wire 21 is electrically connected to the busbar 62 via the first terminal 91.

Note that as shown in FIG. 2, the first wire 21 is connected to the busbar 62 of the terminal block 60 that is arranged inside the housing 40 while being attached to the holder 50.

In the state in which the terminal block 60 is arranged inside the housing 40, the first connection surface 84 and the shaft 101b of the first bolt 101 are exposed to the outside of the housing 40 from the exposure opening 44. The first terminal 91 is electrically connected to the first connection surface 84 in this state. Therefore, the first wire 21 and the first terminal 91 are entirely arranged outside the housing 40.

Second Wire 22

As shown in FIGS. 4 and 6, the second wire 22 is, for example, a coated wire that includes a core wire made of an electrical conductor, and an insulating coating that coats the outer circumference of the core wire. One end portion of the second wire 22 is electrically connected to the second electrical connection box 14 shown in FIG. 1. A second terminal 111 for electrically connecting the second wire 22 to the busbar 62 is connected to the other end portion of the second wire 22. For example, when the not-shown core wire of the second wire 22 at the other end portion of the second wire 22 is electrically connected to one end portion of the second terminal 111 by welding, pressure bonding or the like, the second wire 22 and the second terminal 111 are electrically connected to each other. The electrical connection portion between the core wire of the second wire 22 and the second terminal 111 is coated by an insulating member 112 that has insulating properties. For example, a heat shrinkable tube can be used as the insulating member 112.

The second terminal 111 includes, at an end portion of the second terminal 111 located opposite to its end to which the second wire 22 is connected, a second wire-side connection 113 in a flat-plate shape. The second wire-side connection 113 has a second connection hole 114 that penetrates the second wire-side connection 113 in the thickness direction.

The terminal block 60 includes a second bolt 121 for electrically connecting the second wire 22 to the busbar 62. The second bolt 121 includes a head 121a and a shaft 121b that protrudes from the head 121a. A spiral thread groove is formed in the outer circumferential surface of the shaft 121b. Also, the terminal block 60 includes a second nut 122 for electrically connecting the second wire 22 to the busbar 62. The second nut 122 is arranged between the second connection 82 and the fitting portion 72 that are lined up in the second direction X12. Also, the second wire-side connection 113 is overlapped with the second connection surface 86 so that the second connection hole 114 overlaps with the second through hole 87. Note that the second wire-side connection 113 abuts against the second connection surface 86. The second bolt 121 is screwed to the second nut 122 in such a manner that the shaft 121b thereof passes through the second connection hole 114 and the second through hole 87. Note that the second bolt 121 can easily be screwed to the second nut 122 because a not-shown tool for screwing the second bolt 121 to the second nut 122 can be inserted into the fitting portion 72 from the cutout 76. As a result of the shaft 121b passing through the second through hole 87, the second bolt 121 penetrates the second connection surface 86.

In a state in which the second nut 122 is fastened to the second bolt 121, the central axis line of the shaft 121b is perpendicular to the second connection surface 86, that is, parallel to the second direction X12. Also, in the same state, the second connection 82 and the second wire-side connection 113 are interposed and held between the head 121a of the second bolt 121 and the second nut 122, while abutting against each other. That is to say, the second wire-side connection 113 is electrically connected to the second connection 82. In this way, the second wire 22 is electrically connected to the busbar 62 via the second terminal 111. Also, the second wire 22 is drawn to the outside of the terminal support base 61 from the end portion of the fitting portion 72 that is opposite to the support portion 71.

Note that as shown in FIGS. 2 and 6, the second wire 22 is electrically connected to the second connection surface 86 before the holder 50 is housed in the housing 40. Also, the second wire 22 electrically connected to the second connection surface 86 is drawn to the outside of the housing 40 from the wire draw-out opening 45.

The following will describe functions of the present embodiment.

As a result of the terminal support base 61 included in the terminal block 60 being attached to the attaching portion 52, the terminal block 60 is attached to the holder 50. The first terminal 91 connected to an end of the first wire 21 on one side, and the second terminal 111 connected to an end of the second wire 22 on one side are electrically connected to the busbar 62 supported on the terminal support base 61. Accordingly, the first wire 21 and the second wire 22 can be electrically connected to each other via the busbar 62. Accordingly, electric power of the battery 12 can be supplied to the second electrical connection box 14 via the busbar 62.

As shown in FIG. 5, the second connection surface 86 of the busbar 62 is perpendicular to the first connection surface 84. Therefore, the outer shape of the busbar 62 when viewed in the first direction X11 can be downsized as compared to a case where the second direction X12 is parallel to the first direction X11, and the first connection surface 84 and the second connection surface 86 do not overlap each other when the busbar 62 is viewed in the first direction X11. Accordingly, the terminal block 60 including the busbar 62 can be downsized in a direction perpendicular to the first direction X11.

The following will describe effects of the present embodiment.

(1) The first electrical connection box 13 includes the housing 40, the holder 50 provided inside the housing 40 and holds the electrical component 51, and the terminal block 60 attached to the holder 50. The terminal block 60 includes the terminal support base 61 attached to the holder 50, and the busbar 62 supported on the terminal support base 61. The busbar 62 includes the planar first connection surface 84 to which the first wire 21 is electrically connected, and the planar second connection surface 86 to which the second wire 22, which is different from the first wire 21, is electrically connected. When the direction perpendicular to the first connection surface 84 is defined as the first direction X11, the second connection surface 86 is perpendicular to the second direction X12, which intersects with the first direction X11.

According to this configuration, by electrically connecting the first wire 21 to the first connection surface 84 and electrically connecting the second wire 22 to the second connection surface 86, it is possible to electrically connect the first wire 21 and the second wire 22 via the busbar 62. Also, the second connection surface 86 is perpendicular to the second direction X12, which intersects with the first direction X11 perpendicular to the first connection surface 84. Accordingly, the busbar 62 can be downsized in a direction parallel to the first connection surface 84, that is, a direction perpendicular to the first direction X11, compared to a case where the first connection surface 84 and the second connection surface 86 are provided in the same plane. Also, the busbar 62 can be downsized in a direction perpendicular to the first direction X11, compared to a case where the first connection surface 84 and the second connection surface 86 are parallel to each other and are lined up without overlapping each other when viewed in the first direction X11. Accordingly, it is possible to reduce the area of an installation space for the busbar 62 when viewed in the first direction X11. As a result, the terminal block 60 can be downsized in a direction perpendicular to the first direction X11, thus making it possible to suppress an increase in the size of the first electrical connection box 13 including the terminal block 60. That is to say, it is possible to install, in the first electrical connection box 13, the terminal block 60 for electrically connecting the first wire 21 and the second wire 22 to each other, while suppressing an increase in the size of the first electrical connection box 13.

Also, since an increase in the size of the first electrical connection box 13 including the terminal block 60 is suppressed, the difficulties in ensuring a space for installing the first electrical connection box 13 in the vehicle 10 are likely to be eliminated. That is to say, even if the first electrical connection box 13, instead of an electrical connection box without any terminal block 60, is installed, the difficulties in ensuring the space for installing the first electrical connection box 13 is suppressed.

Also, when the first electrical connection box 13 is installed in the vehicle 10, a separate terminal block does not need to be disposed near the first electrical connection box 13. Accordingly, omitting a separate terminal block to be arranged near the first electrical connection box 13 allows the vehicle 10 to have a space for installing another member.

Also, the terminal block 60 includes the terminal support base 61 attached to the holder 50. Therefore, the part that directly supports the busbar 62 is separate from the holder 50. Accordingly, even if, for example, the busbar 62 has a complicated shape, it is possible to avoid a case where the holder 50 has a complicated shape. Also, since the terminal support base 61 supports the busbar 62, it is possible to prevent the busbar 62 from being unintentionally deformed, e.g., bent, when the first wire 21 is electrically connected to the first connection surface 84. In the present embodiment, when the first nut 102 is fastened to the first bolt 101 so that the first wire 21 is electrically connected to the first connection surface 84, the terminal support base 61 serves as a base for supporting the first bolt 101 and the busbar 62. Accordingly, in a state in which the busbar 62 is supported by the terminal support base 61 and thus the orientation of the busbar 62 is stable, it is possible to fasten the first nut 102 to the first bolt 101. Furthermore, it is possible to suppress unintentional deformation of the busbar 62 that may occur when the first nut 102 is fastened to the first bolt 101.

Also, since the terminal support base 61 that supports the busbar 62 is provided separately from the holder 50 that holds the electrical component 51, and from the housing 40, a wire harness that includes the first wire 21, the second wire 22, and the first electrical connection box 13 is easily manufactured. For example, if the terminal block 60 is attached to the holder 50, and then the electrical component 51 and the like are assembled to the holder 50, the assembling of the electrical component 51 and the like to the holder 50 may be complicated due to troublesome handling of the second wire 22. In the present embodiment, typically, a wire having a large diameter is used as the second wire 22, since the second wire 22 is electrically connected to the battery 12 that can supply a voltage of, for example, about a hundred and several tens of volts to several hundred of volts. Therefore, the handling of the second wire 22 may be more troublesome. However, in the present embodiment, since the terminal support base 61 is separate from the holder 50, during a process for manufacturing the first electrical connection box 13, upon completion of assembling the electrical component 51 and the like to the holder 50, it is possible to fit, to the holder 50, the terminal block 60 from which the second wire 22 has been drawn. That is to say, it is possible to attach the terminal block 60 to the holder 50 immediately before bringing the holder 50 into the housing 40. This facilitates the manufacturing of the first electrical connection box 13, and moreover, the manufacturing of a wire harness including the first electrical connection box 13 and the second wire 22.

Also, for example, if the holder 50 and the terminal support base 61 are formed as one piece, the shape of the holder 50 that includes the terminal support base 61 will be more complicated than the holder 50 according to the present embodiment in which the separate terminal support base 61 is provided. Therefore, if a molding die is used to manufacture the holder 50 including the terminal support base 61, the position of the holder 50 at which the terminal support base 61 is to be provided may be restricted in view of the structure of the molding die. In the present embodiment, since the holder 50 and the terminal support base 61 are formed as separate members, the holder 50 and the terminal support base 61 are formed by using separate molding dies. Accordingly, the position of the holder 50 at which the terminal support base 61 is to be provided has a higher degree of freedom than when the holder 50 and the terminal support base 61 are formed as one piece.

(2) The second direction X12 intersects perpendicularly with the first direction X11. Therefore, the second connection surface 86 is provided so as to be perpendicular to the first connection surface 84. Accordingly, it is possible to suppress a space for the second connection surface 86 to the minimum when the busbar 62 is viewed in the first direction X11. As a result, the busbar 62 can further be downsized in the direction parallel to the first connection surface 84, that is, the direction perpendicular to the first direction X11. Accordingly, it is possible to further reduce the area of an installation space for the busbar 62 when viewed in the first direction X11, resulting in a further downsizing of the terminal block 60 in the direction perpendicular to the first direction X11. As a result, it is possible to further suppress an increase in the size of the first electrical connection box 13 including the terminal block 60. That is to say, it is possible to install, in the first electrical connection box 13, the terminal block 60 for electrically connecting the first wire 21 and the second wire 22 to each other, while further suppressing an increase in the size of the first electrical connection box 13.

(3) The terminal block 60 includes the first bolt 101 that penetrates the first connection surface 84. Therefore, by using the first nut 102 that is screwed to the first bolt 101, the first wire 21 can easily be electrically connected to the first connection surface 84. That is to say, by fastening the first nut 102 to the first bolt 101, it is possible to easily electrically connect first terminal 91 connected to an end of the first wire 21 on one side to the first connection surface 84, without performing welding or the like.

(4) The terminal block 60 includes the second bolt 121 that penetrates the second connection surface 86. Therefore, by using the second nut 122 that is screwed to the second bolt 121, the second wire 22 can easily be electrically connected to the second connection surface 86. That is to say, by fastening the second nut 122 to the second bolt 121, it is possible to easily electrically connect the second terminal 111 connected to an end of the second wire 22 on one side to the second connection surface 86, without performing welding or the like.

(5) The first connection surface 84 is exposed to the outside of the housing 40 from the exposure opening 44. Therefore, even after the holder 50 to which the terminal block 60 is attached is arranged inside the housing 40, it is possible to electrically connect the first wire 21 to the first connection surface 84. Accordingly, the time when the first wire 21 is electrically connected to the first connection surface 84 has a high degree of freedom. Also, it is possible to electrically connect the first wire 21 to the first connection surface 84, without removing the cover 42 from the case 41.

OTHER EMBODIMENTS

The present embodiment can be executed in the following modifications. The present embodiment and the following modifications can be executed in combinations in a range in which they do not technically contradict each other.

- In the present embodiment, the terminal block 60 includes the second bolt 121. However, the terminal block 60 does not necessarily include the second bolt 121. In this case, the second terminal 111 is electrically connected to the second connection surface 86 by welding, pressure bonding, or the like, instead of fastening of the second bolt 121 and the second nut 122. Also, in the same case, the core wire of the second wire 22 may be electrically connected directly to the second connection surface 86 by welding or pressure-bonding, for example.
- In the present embodiment, the terminal block 60 includes the first bolt 101. However, the terminal block 60 does not necessarily include the first bolt 101. In this case, the first terminal 91 is electrically connected to the first connection surface 84 by welding, pressure bonding, or the like, instead of fastening of the first bolt 101 and the first nut 102. Also, in the same case, the core wire of the first wire 21 may be electrically connected directly to the first connection surface 84 by welding or pressure-bonding, for example.
- In the present embodiment, the second direction X12 is perpendicular to the first direction X11. However, in the present embodiment, the second direction X12 is not limited to a direction perpendicular to the first direction X11, and may be any direction that intersects with the first direction X11.
- The shape of the busbar 62 is not limited to the shape in the above-described embodiment as long as the busbar 62 includes the first connection surface 84 and the second connection surface 86. Note however that the second connection surface 86 is provided so as to be perpendicular to the second direction X12, which intersects with the first direction X11. For example, the busbar 62 may have a shape that includes a step-shaped portion between the second connection 82 and the bent portion 83. Also, the busbar 62 may have a connection surface to which a wire other than the first wire 21 and the second wire is to be electrically connected.
- The shape of the terminal support base 61 is not limited to the shape in the above-described embodiment. It is sufficient that the terminal support base 61 has a shape such that it can support the busbar 62 and can be attached to the holder 50. For example, the support portion 71 may have the shape of a circular disk, and the fitting portion 72 may have the shape of a circular cylinder.
- In the above-described embodiment, the terminal support base 61 is attached to the attaching portion 52, as a result of the first locked portion 77 being locked to the first locking portion provided on the attaching portion 52, and the second locked portion 78 being locked to the second locking portion provided on the attaching portion 52. However, the method for attaching the terminal support base 61 to the holder 50 is not limited to this. For example, the terminal support base 61 may have a configuration in which it is arranged on the holder 50, and is prevented from being removed from the holder 50 by the housing 40.
- In the above-described embodiment, the attaching portion 52 is tubular. However, the shape of the attaching portion 52 is not limited to the shape in the above-described embodiment as along as the terminal support base 61 can be attached to the attaching portion 52. For example, the attaching portion 52 may be flat plate-shaped, and may include a part that can fix the terminal support base 61, such as a claw.
- In the above-described embodiment, the first electrical connection box 13 includes only one terminal block 60. However, the first electrical connection box 13 may include a plurality of terminal blocks 60.
- In the above-described embodiment, the terminal block 60 electrically connects the first wire 21 and the second wire 22 that are for connecting the battery 12 to the second electrical connection box 14. However, the electrical apparatus and the electrical connection box that are connected to each other via the terminal block 60 are not limited to those, and any electrical apparatus and any electrical connection box may be used as long as they are installed in the vehicle 10. Also, the terminal block 60 may electrically connect wires that electrically connect electronic apparatuses to each other, or may electrically connect wires that electrically connect electrical connection boxes to each other.
- As shown in FIGS. 4 and 6, the first bolt 101 may include the head 101a, a boss that protrudes from the head 101a, and the shaft 101b that protrudes from the boss. The boss may have a size such that the outer diameter thereof is greater than the inner diameter of the first through hole 85 formed in the first connection 81 of the busbar 62, and the boss does not protrude from the head 101a. The leading end surface of the boss may protrude slightly from the support surface 73 in a state in which the first bolt 101 is assembled to the terminal support base 61. As shown in FIG. 6, the first connection 81 may abut against the boss in a state in which the first nut 102 is fastened to the first bolt 101. With this, it is possible to interpose the first connection 81 and the first wire-side connection 93 between the first nut 102 and the boss that are both made of a metal, and reliably connect the first wire-side connection 93 to the first connection 81. A gap may also be formed between the first connection 81 and the support surface 73.
- As shown in FIG. 5, the first connection 81 may have a shape such that it does not protrude from the support portion 71, when viewed from a direction perpendicular to the support surface 73. With this, the first connection 81 can easily abut against the support portion 71, and thus it is possible to suppress excessive deformation of the first connection 81.
- As shown in FIG. 4, the head 101a of the first bolt 101 may be square columnar. The insertion recess 75 may have a square columnar fitting space to which the head 101a is fitted. As shown in FIG. 6, the retaining portion 75c may abut against the leading end surface of the head 101a. The insertion recess 75 may be referred to simply as a recess.

As shown in FIGS. 4 and 6, the first connection 81 may be provided so as to be orthogonal to the second connection 82. As shown in FIG. 4, the first through hole 85 may have the shape of a true circle, and the second through hole 87 may have the shape of an oval elongated in the first direction X11.

The present disclosure includes the following implementation examples. Reference numerals of some constituent components of the exemplary embodiment are given not for restrictive reasons but for help in understanding. Some of the items described in the following implementation examples may be omitted, or some of the items described in the following implementation examples may be selected or extracted and combined with each other.

Appendix 1

In some aspects of the present disclosure, the housing (40) may include a case (41) having an opening, and a cover (42) that covers the opening, the holder (50) may include an attaching portion (52) to which the terminal block (60) is attached, and the cover (40) may have an exposure opening (44) that exposes the attaching portion (52) to the outside of the housing (40).

Appendix 2

In some aspects of the present disclosure, the terminal support base (61) may include a plate-shaped support portion (71) having a support surface (73), and a tubular portion (72) extending from the outer peripheral edge of the support portion (71), the terminal block (60) may include a first bolt (101) assembled to the support portion (71), the first bolt (101) may include a head (101a) that is inserted into the recess portion (75), a boss that protrudes from the head (101a), and a shaft (101b) that protrudes from the boss, the boss may protrude from the support surface (73), the busbar (62) may include a plate-shaped first connection (81) having the first connection surface (84), the first connection (81) may include a first through hole (85) that has an inner diameter greater than the outer diameter of the shaft (101b) and smaller than the inner diameter of the boss, and into which the shaft (101b) is inserted, and the first connection (81) may abut against the boss.

Appendix 3

In some aspects of the present disclosure, the first connection (81) may have a shape such that it does not protrude from the support portion (71), when viewed in a direction perpendicular to the support surface (73).

Appendix 4

In some aspects of the present disclosure, the second connection (82) may have a second through hole (87) that is oval and is elongated in the first direction (X11).

Appendix 5

In some aspects of the present disclosure, the busbar (62) may be an L-shaped plate that is bent so that the first connection surface (84) substantially makes a right angle with the second connection surface (85), and the heads (101a, 121a) of the first bolt (101) and the second bolt (121) may be arranged on the inner side of the L shape of the busbar (62), and the shafts (101b, 121b) of the first bolt (101) and the second bolt (121) may be arranged on the outer side of the L shape of the busbar (62).

Appendix 6

In some aspects of the present disclosure, the terminal block (60) may be configured to be inserted into the attaching portion (52) of the holder (50) from the inner side of the holder (50) in the first direction (X11), for example, linearly, so that the first connection surface (84) of the busbar (62) is arranged outside the housing (40) and/or the holder (50) in the first direction (X11), and the second connection surface (86) of the busbar (62) is arranged inside the housing (40) and/or the holder (50) in the first direction (X11).

Appendix 7

In some aspects of the present disclosure, the busbar (62) may have a configuration in which before the terminal block (60) is inserted into the attaching portion (52) of the holder (50), the second wire (22) is brought into contact with the second connection surface (86) from the outside of the terminal block (60) in the second direction (X12), and is fastened by the second bolt (121) from the outside of the terminal block (60) in the second direction (X12), and after the terminal block (60) has been inserted into the attaching portion (52) of the holder (50), the first wire (21) is brought into contact with the first connection surface (84) from the outside of the terminal block (60) in the first direction (X11), and is fastened by the first bolt (101) from the outside of the terminal block (60) in the first direction (X11).

LIST OF REFERENCE NUMERALS

10 Vehicle
11 Electrical apparatus
12 Battery
13 First electrical connection box (electrical connection box)
14 Second electrical connection box
15 Engine room
21 First wire
22 Second wire
40 Housing
41 Case
42 Cover
44 Exposure opening
45 Wire draw-out opening
50 Holder
51 Electrical component
52 Attaching portion
60 Terminal block
61 Terminal support base
62 Busbar
71 Support portion
71a Side surface
72 Fitting portion
73 Support surface
74 Insertion hole
75 Insertion recess
75b Opening
75c Retaining portion
75d Insertion opening
76 Cutout
77 First locked portion
77a First locked surface
78 Second locked portion 81 First connection
82 Second connection
83 Bent portion
84 First connection surface
85 First through hole
86 Second connection surface
87 Second through hole
91 First terminal
92 Insulating member
93 First wire-side connection
94 First connection hole
101 First bolt
101a Head
101b Shaft
102 First nut
111 Second terminal
112 Insulating member
113 Second wire-side connection
114 Second connection hole
121 Second bolt
121a Head
121b Shaft
122 Second nut
X1 Fitting direction
X11 First direction
X12 Second direction

What is claimed is:

1. An electrical connection box comprising:
a housing;
a holder that is provided inside the housing and holds an electrical component, the holder including an attaching portion having a tubular shape extending in a fitting direction; and
a terminal block that is configured to be attached to the holder by insertion into the attaching portion in the fitting direction and includes a terminal support base attached to the holder, and a busbar supported on the terminal support base,
wherein the busbar includes
a first connection surface having a planar area to which a first wire is to be electrically connected, and
a second connection surface having a planar area to which a second wire is to be electrically connected, the second wire being different from the first wire, and
wherein, when a direction perpendicular to the planar area of the first connection surface is defined as a first direction, the planar area of the second connection surface is perpendicular to a second direction that intersects with the first direction.

2. The electrical connection box according to claim 1, wherein the second direction intersects perpendicularly with the first direction.

3. The electrical connection box according to claim 1, wherein the terminal block includes a first bolt that penetrates the first connection surface.

4. The electrical connection box according to claim 1, wherein the terminal block includes a second bolt that penetrates the second connection surface.

5. The electrical connection box according to claim 1, wherein the first direction coincides with the fitting direction.

6. The electrical connection box according to claim 1,
wherein the planar area of the first connection surface is configured to receive a planar surface of the first wire in the first direction, and
wherein the planar area of the second connection surface is configured to receive a planar surface of the second wire in the second direction, the second direction intersecting perpendicularly with the first direction.

7. The electrical connection box according to claim 1, wherein
the housing includes a wire draw-out opening that is in communication with an inside and an outside of the housing,
the second wire is electrically connected to the second connection surface before the holder is housed in the housing, and
the second wire electrically connected to the second connection surface is drawn to the outside of the housing from the wire draw-out opening.

8. The electrical connection box according to claim 1, wherein the busbar is made of a metal plate material and comprises:
a first connection formed as a rectangular flat plate having one side in a thickness direction constituting the first connection surface to which the first wire is to be electrically connected;
a second connection formed as a rectangular flat plate having one side in a thickness direction constituting the second connection surface to which the second wire is to be electrically connected; and
a bent portion that connects the first connection and the second connection and is formed by bending the metal plate material into an L-shaped configuration.

9. The electrical connection box according to claim 8, further comprising:
a first bolt for electrically connecting the first wire to the first connection surface,
wherein the first connection includes a first through hole that penetrates the first connection in the first direction, an opening of the first through hole having one end communicating with the first connection surface, and
wherein the first through hole is configured to receive the first bolt such that a nut may be attached to the first bolt in opposition to the planar area of the first connection surface.

10. The electrical connection box according to claim 9, further comprising:
a second bolt for electrically connecting the second wire to the second connection surface,
wherein the second connection includes a second through hole that penetrates the second connection in the second direction, an opening of the second through hole having one end communicating with the second connection surface, and
wherein the second through hole is configured to receive the second bolt such that a nut may be attached to the second bolt in opposition to the planar area of the second connection surface.

* * * * *